Patented Mar. 6, 1934

1,949,916

UNITED STATES PATENT OFFICE 1,949,916

SOLDERING FLUX

Howard S. McQuaid, East Chicago, Ind., assignor to The Grasselli Chemical Company, Cleveland, Ohio, a corporation of Delaware No Drawing. Application December 26, 1929, Serial No. 416,752

10 Claims. (Cl. 148—23)

The action of soldering fluxes seems to depend upon two main factors: dissolution of the oxide films on the metals to be united and reduction of the surface tension of the molten solder whereby it becomes capable of wetting and spreading over the surface of the metal pieces to be united. Zinc chloride and rosin, or colophony, alone or in combination with various other materials are the most convenient fluxes used in soft soldering of various metals.

I have found that the hydrochlorides of organic amines have to a remarkable extent the properties required of soft soldering fluxes and my invention comprises the process of soft soldering metals with the addition of the hydrochloride of an organic amine.

A large number of organic amines are known; some of them, when of sufficient basicity, form stable, and well defined, often crystallizable hydrochlorides, which in numerous instances are water soluble. They can be used as such or in form of their aqueous or alcoholic solutions in the same manner as ordinary solid or liquid soldering fluxes are used.

The hydrochlorides of the stronger basic aliphatic amines, as well as the hydrochlorides of the weaker aromatic amines, are very efficient fluxes. They can be used with solders of the usual composition, such as for instance 50—50, tin lead solder on various metals, such as tin plate, brass, steel, copper, etc. In efficiency they rank with zinc chloride fluxes, which up to the present time were considered among the best soft soldering fluxes.

A small number of organic amines are available at prices which allow of their use in preparing soft soldering fluxes. Aniline, the toluidines and naphthylamines of the aromatic series, diethylamine, butylamine and the ethanolamines of the aliphatic series are among such cheap organic amines. They form stable hydrochlorides which are either water or alcohol soluble. These hydrochlorides have all been tested for their fluxing properties and were found to be practically as efficient as zinc chloride. Used as such these amine hydrochlorides have an extremely strong fluxing action. In alcoholic solutions down to about 10% and in water solutions down to even 1% concentration their fluxing action is still very noticeable.

In efficiency the amine hydrochlorides rank way above ammonium chloride as a flux. I also found that very few organic amines as such have any fluxing properties and it seems that such properties only develop when the amines have been combined with hydrochloric acid to form hydrochlorides.

Amine hydrochlorides can be added to zinc chloride and to rosin fluxes in the same manner as other composite fluxes are prepared. The art of soft soldering is one which is still on a more or less empirical basis and formulæ for fluxes vary considerably, many shops having fluxes of their own composition found best for their particular purposes. Amine hydrochlorides have been incorporated into composite fluxes which in each instance have been found to have excellent properties. As an example of such a composite flux I might mention a mixture of 50 parts zinc chloride and 50 parts aniline salt (the common name of aniline hydrochloride) or ethanolamine hydrochloride (ethanolamine being the trade name of a technical mixture of mono, di, and triethanolamine). This dissolves easily in water and can be used as an efficient flux in all concentrations down to a few per cent.

I claim:

1. In a process of soft soldering metals the step of applying a soldering flux comprising the hydrochloride of an aliphatic amine.

2. In a process of soft soldering metals the step of applying a soldering flux comprising zinc chloride and the hydrochloride of an organic amine.

3. As a new composition of matter a soft soldering flux comprising zinc chloride and an organic amine hydrochloride.

4. A soldering flux comprising a hydrochloride of an aliphatic amine.

5. In a process of soft soldering metals the step of applying a soldering flux comprising an aqueous solution of the hydrochloride of an aliphatic amine.

6. A soldering flux comprising an aqueous solution of the hydrochloride of an aliphatic amine.

7. In a process of soft soldering metals the step of applying a soldering flux comprising the hydrochloride of an ethanolamine.

8. A soldering flux comprising the hydrochloride of an ethanolamine.

9. A flux for soldering objects sensitive to corrosion comprising colophony and aniline hydrochloride.

10. A flux for soldering objects sensitive to corrosion comprising a resin and orthotoluidine hydrochloride.

HOWARD S. McQUAID.